United States Patent
Magno, Jr. et al.

(10) Patent No.: US 9,160,153 B2
(45) Date of Patent: Oct. 13, 2015

(54) SIDE-OPEN WET-LOCATION ELECTRICAL BOX AND COVER

(71) Applicant: Thomas & Betts International, Inc., Wilmington, DE (US)

(72) Inventors: Joey D. Magno, Jr., Cordova, TN (US); Mark R. Drane, Germantown, TN (US); Robert Kevin Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 449 days.

(21) Appl. No.: 13/765,917

(22) Filed: Feb. 13, 2013

(65) Prior Publication Data

US 2013/0306343 A1 Nov. 21, 2013

Related U.S. Application Data

(60) Provisional application No. 61/647,072, filed on May 15, 2012.

(51) Int. Cl.
*H02G 3/14* (2006.01)
*H02G 3/08* (2006.01)

(52) U.S. Cl.
CPC . *H02G 3/14* (2013.01); *H02G 3/088* (2013.01)

(58) Field of Classification Search
CPC ....................................................... H02G 3/14
USPC ........................................................... 174/67
See application file for complete search history.

(56) References Cited

U.S. PATENT DOCUMENTS

| | | | |
|---|---|---|---|
| 1,133,946 A | 3/1915 | Farrell | |
| 3,622,029 A | 11/1971 | Ware | |
| 3,690,501 A | 9/1972 | Ware | |
| 4,613,728 A * | 9/1986 | Lathrop | 174/53 |
| 4,758,687 A | 7/1988 | Lathrop | |
| 5,272,281 A * | 12/1993 | Bouley | 174/67 |
| 5,378,854 A | 1/1995 | Hoover | |
| 5,574,255 A | 11/1996 | Simmons | |
| 5,596,174 A | 1/1997 | Sapienza | |
| 5,693,909 A | 12/1997 | McEwen | |
| 5,874,692 A | 2/1999 | Simmons | |
| 6,007,353 A * | 12/1999 | Webster | 439/142 |
| 6,827,230 B1 * | 12/2004 | Tuniewicz et al. | 220/3.8 |
| 7,964,794 B2 | 6/2011 | Chung | |

(Continued)

FOREIGN PATENT DOCUMENTS

CA 2092516 10/1993

*Primary Examiner* — Timothy Thompson
*Assistant Examiner* — Charles Pizzuto
(74) *Attorney, Agent, or Firm* — Snyder, Clark, Lesch & Chung, LLP (57) ABSTRACT

An electrical box includes a back wall and a front wall, configured to be essentially parallel to a mounting surface when the base is installed to the mounting surface, and a pair of interchangeable top and bottom walls. Each interchangeable top and bottom wall is connected to the back wall and the front wall. The electrical box includes a side wall connected to each of the other walls and an open end opposite the side wall that is configured to receive an electrical device therein. A standoff extends laterally from the back wall. The standoff is configured to provide a mounting structure and to position the electrical box away from the mounting surface. The electrical box is configured to receive a top-mounted hood to cover the open end when the base is installed with the open end positioned to face either of the right side or the left side.

21 Claims, 8 Drawing Sheets

(56) References Cited

U.S. PATENT DOCUMENTS

| | | | |
|---|---|---|---|
| 8,251,253 B1 * | 8/2012 | Cleghorn et al. | 220/844 |
| 8,816,201 B1 * | 8/2014 | Shotey et al. | 174/66 |
| 2008/0179072 A1 * | 7/2008 | Drane et al. | 174/67 |
| 2008/0179073 A1 * | 7/2008 | Drane et al. | 174/67 |
| 2011/0005800 A1 * | 1/2011 | Magno, Jr. | 174/61 |
| 2011/0011710 A1 | 1/2011 | Dodal et al. | |

\* cited by examiner

SIDE-OPEN WET-LOCATION ELECTRICAL BOX AND COVER

CROSS-REFERENCE TO RELATED APPLICATION

This application claims priority under 35 U.S.C. §119, based on U.S. Provisional Patent Application No. 61/647,072, filed May 15, 2012, the disclosure of which is hereby incorporated by reference herein.

BACKGROUND INFORMATION

Electrical outlets with covers may be used in areas that are exposed to water or that require wash-down of all equipment on a regular basis, such as the food and beverage industry. These electrical outlets typically are mounted with spacers to set them away from the wall to provide access for cleaning and to prevent collection of contaminants.

DETAILED DESCRIPTION OF PREFERRED EMBODIMENTS

The following detailed description refers to the accompanying drawings. The same reference numbers in different drawings may identify the same or similar elements.

In food service areas and other areas that require regular wash-down of equipment, standoffs for electrical boxes are required to provide a space between the electrical box and the wall (e.g., to allow for cleaning). Covers (or hoods) are mounted to the electrical boxes. Typically, the electrical boxes are mounted facing outward from a wall. The combination of the standoff and outward-facing electrical box causes a significant protrusion into a workspace, which can subject the electrical box to knocks and/or cause a safety hazard. Furthermore, existing electrical box arrangements are susceptible to condensation inside the electrical box, causing a potential for a short in an electrical device that is installed in the electrical box.

According to implementations described herein, a side-facing electrical box assembly with standoffs is provided. The electrical box assembly may include a base and a hood that are joined by a hinge for opening and closing the hood. The electrical box may be mounted with either a left- or right-side facing opening and provides a low-profile installation (e.g., in comparison with front-facing installations). The electrical box may be configured with a separate conduit area and device mounting area to drain moisture from condensation on the conduit and to prevent moisture from migrating to installed devices.

In descriptions herein, the term "front" may generally refer to a position toward a room's interior, and the term "back" generally refer to a position toward a wall or exterior of the room.

Figure 1:
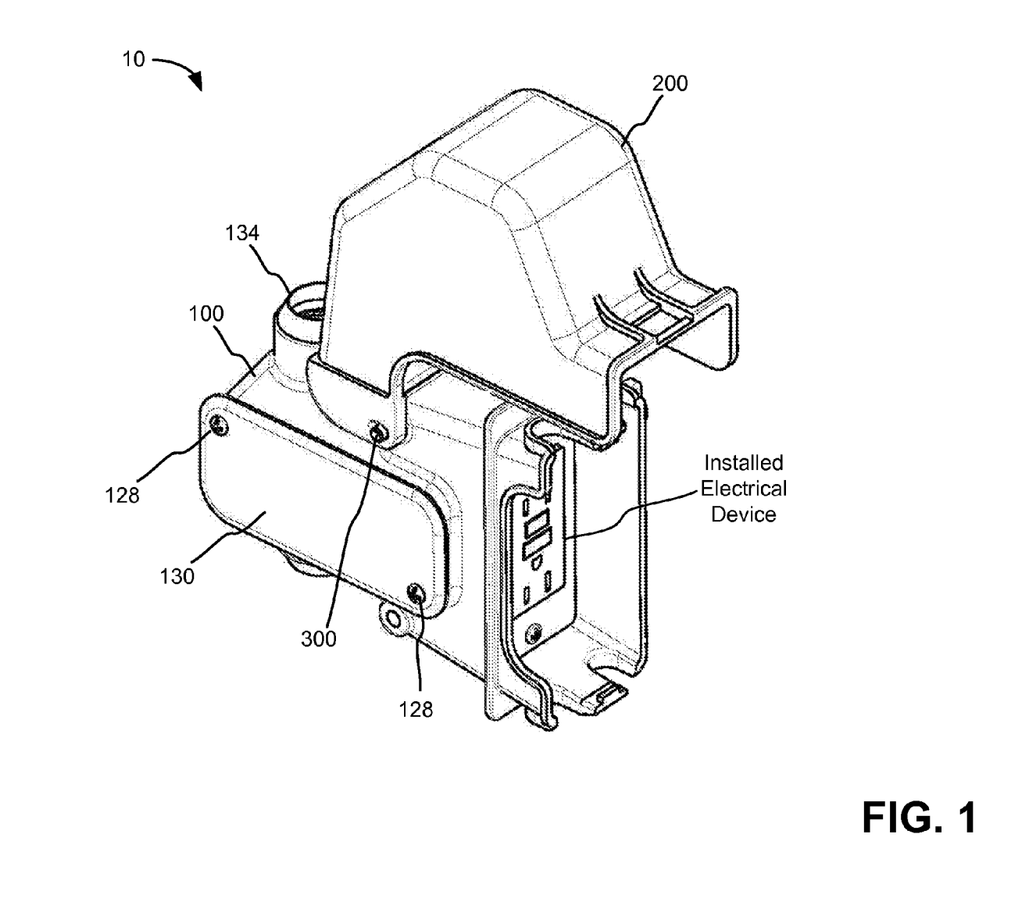
FIG. 1 provides a front perspective view of a side-open electrical box assembly with an open hood according to an implementation described herein.
Figure 2:
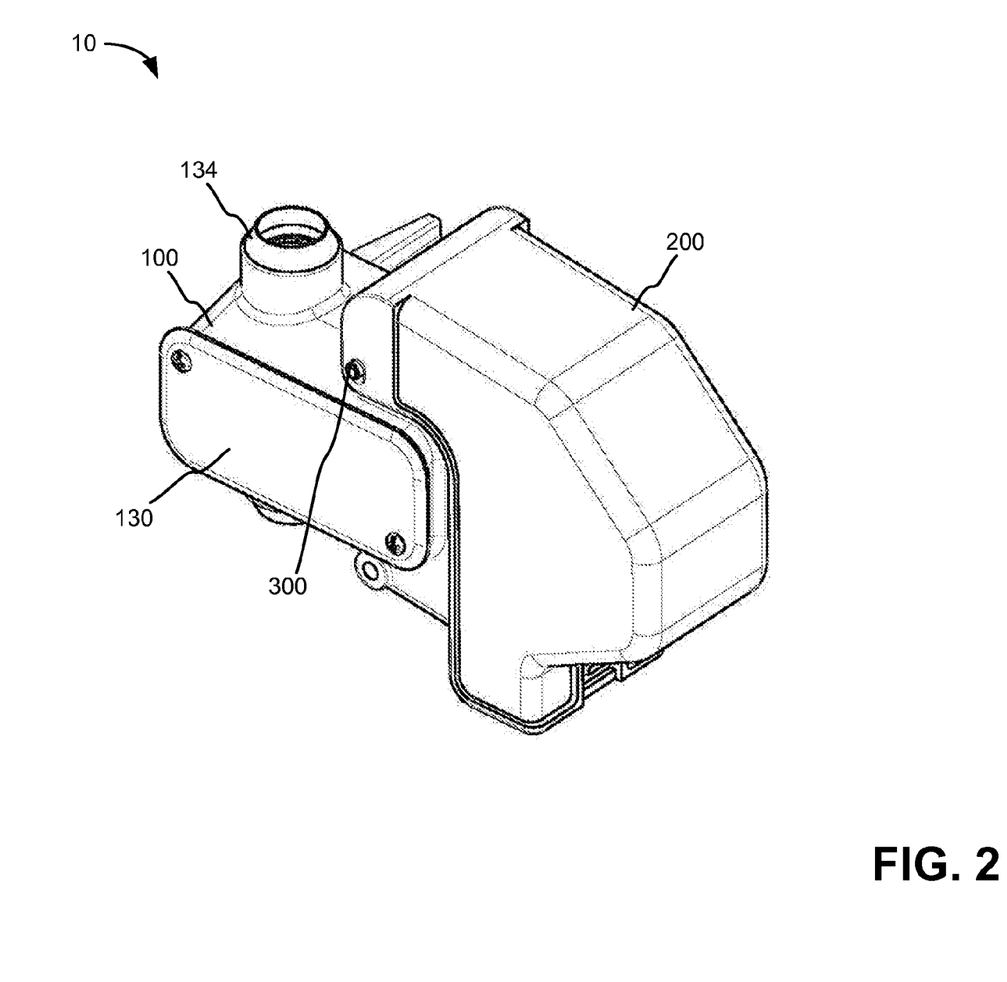
FIG. 2 provides a front perspective view of the side-open electrical box assembly of FIG. 1 with a closed cover.
Figure 3:
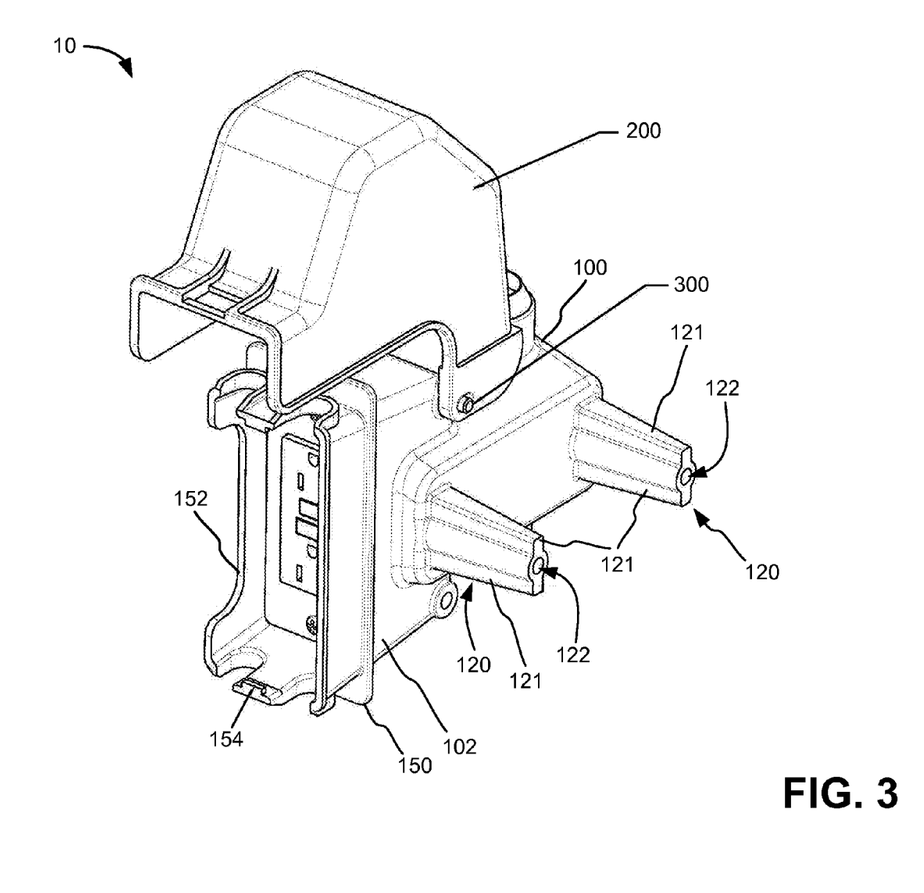
FIG. 3 provides a rear perspective view of the side-open electrical box assembly of FIG. 1.

FIG. 1 provides a front perspective view of a side-open electrical box 10 with an open hood according to an implementation described herein. FIG. 2 provides a front perspective view of side-open electrical box assembly 10 with the hood in a closed position. FIG. 3 provides a rear perspective view of side-open electrical box assembly 10 with an open cover. Referring collectively to FIGS. 1-3, electrical box assembly 10 may include a base 100 and a hood 200. Hood 200 may be secured to base 100 by a hinge pin 300. Hood 200 may pivot about hinge pin 300 between an open position (shown in FIGS. 1 and 3) and a closed position (shown in FIG. 2).

Base 100, hood 200, and hinge pin 300 may be made from non-corrosive materials suitable, for example, in food service industry environments. Suitable materials may include, for example, stainless steel, polyvinyl chloride (PVC), polycarbonate, nylon 6-6, etc. Depending on a selected material, base 100, hood 200, and hinge pin 300 may be manufactured using an investment casting process, injection molding, etc. In one implementation, base 100, hood 200, and hinge pin 300 may all be made from the same material. In other implementations, one or more of base 100, hood 200, and hinge pin 300 may be made from different materials.

Figure 4:
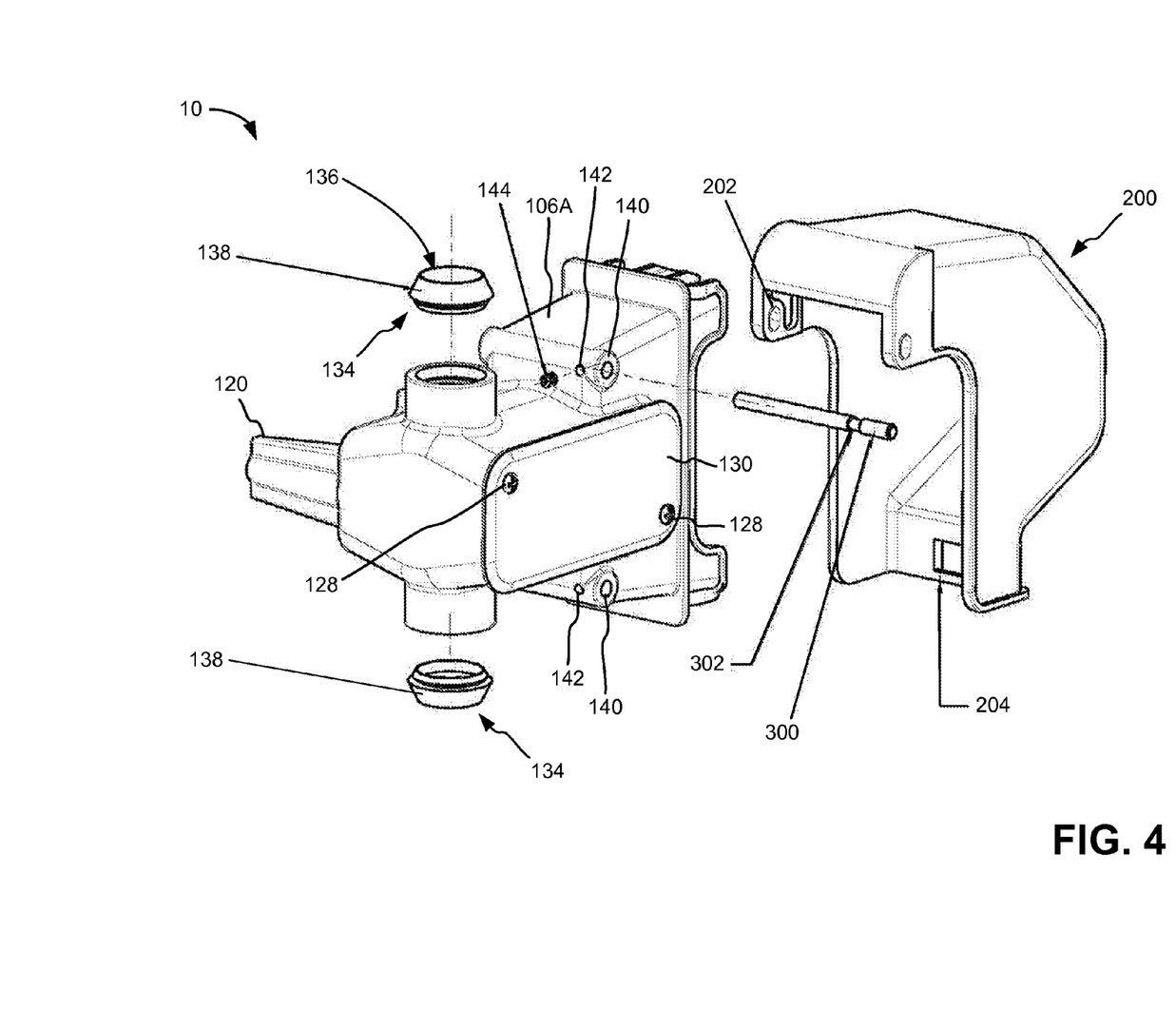
FIG. 4 provides an exploded front perspective view of the side-open electrical box assembly of FIG. 1.
Figure 5A:
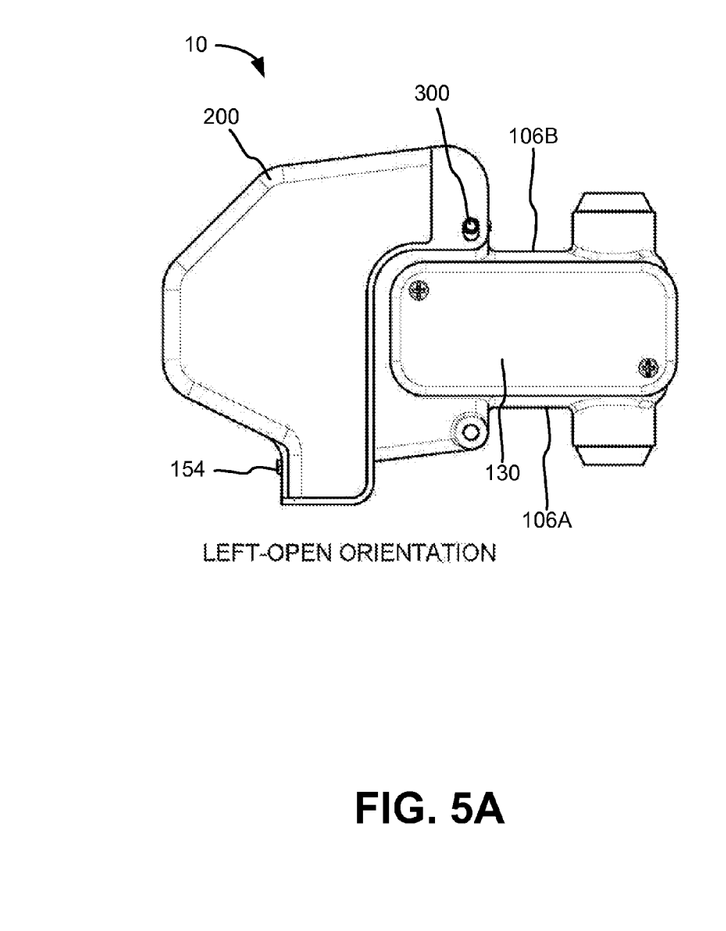
FIG. 5A provides a front view of the side-open electrical box assembly of FIG. 1 in a left-side-open configuration.
Figure 5B:
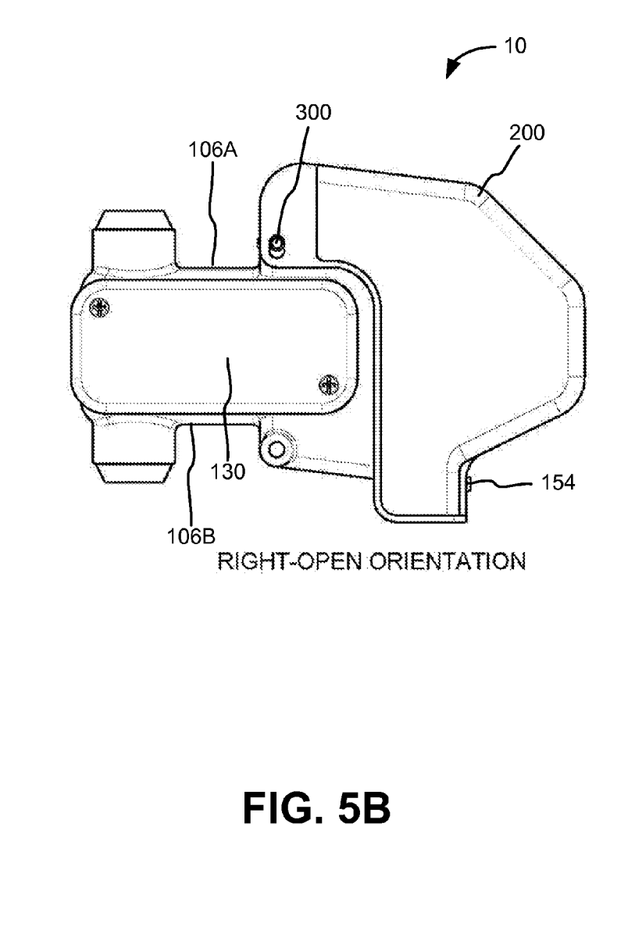
FIG. 5B provides a front view of the side-open electrical box assembly of FIG. 1 in a right-side-open configuration.
Figure 6:
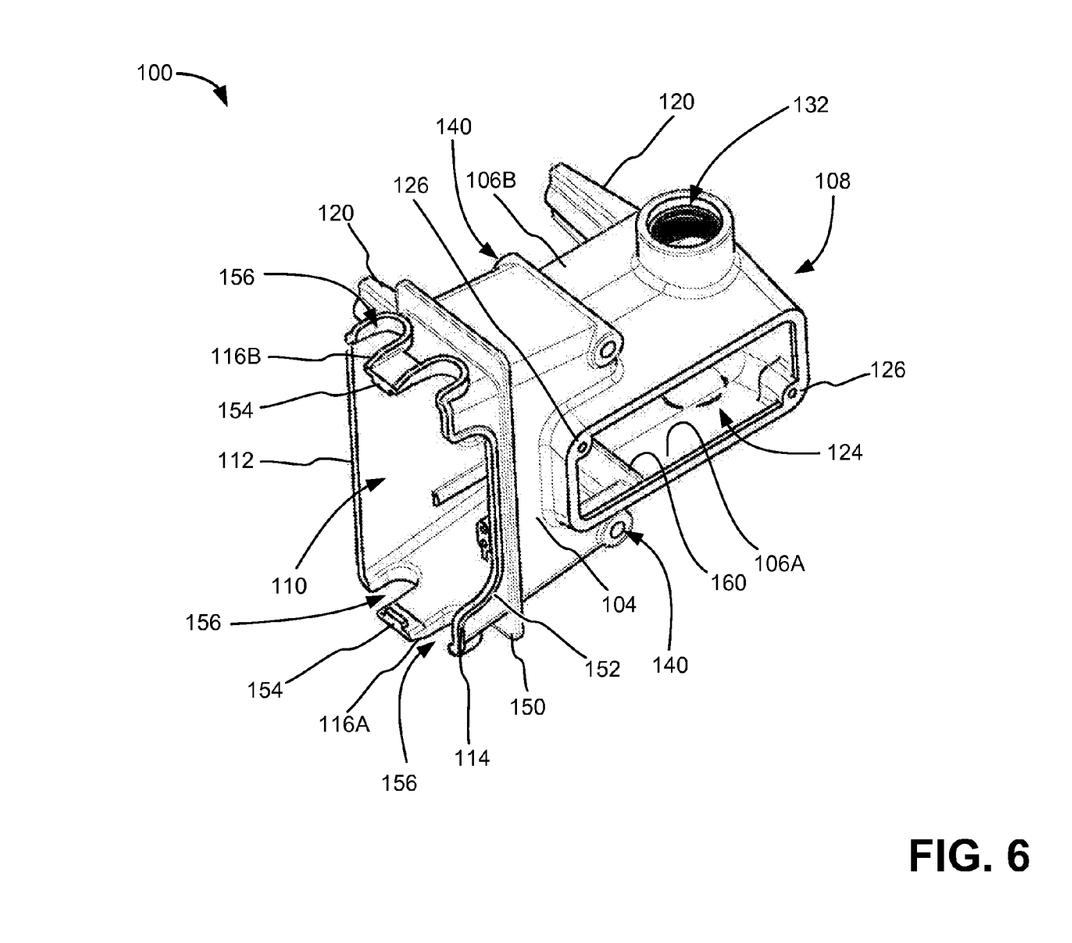
FIG. 6 provides a front perspective view of the base of the electrical box assembly of FIG. 1.

FIG. 4 provides an exploded front perspective view of electrical box assembly 10. FIGS. 5A and 5B provide front views of electrical box assembly 10 in a left-side-open and right-side-open configuration, respectively. FIG. 6 provides a front perspective view of base 100. Referring collectively to FIGS. 1-6, base 100 may generally form a box-like structure to receive an electrical device, such as an outlet or a switch. Base 100 may include a back wall 102, a front wall 104, top/bottom walls 106A and 106B (referred to herein collectively as "top/bottom walls 106" or generically as "top wall 106" or "bottom wall 106"). Back wall 102, front wall 104, and top/bottom walls 106 may be joined by a closed-side wall 108 at one end. Back wall 102, front wall 104, and top/bottom walls 106 may also form a side opening 110 at an opposite end. More particularly, a back wall edge 112, a front wall edge 114, and top/bottom wall edges 116A and 116B (referred to herein collectively as "top/bottom wall edges 116") may define side opening 110 that is configured to receive an electrical device. Side opening 110 may be configured to receive the electrical device facing essentially perpendicular to a plane of the mounting surface.

Figure 7:
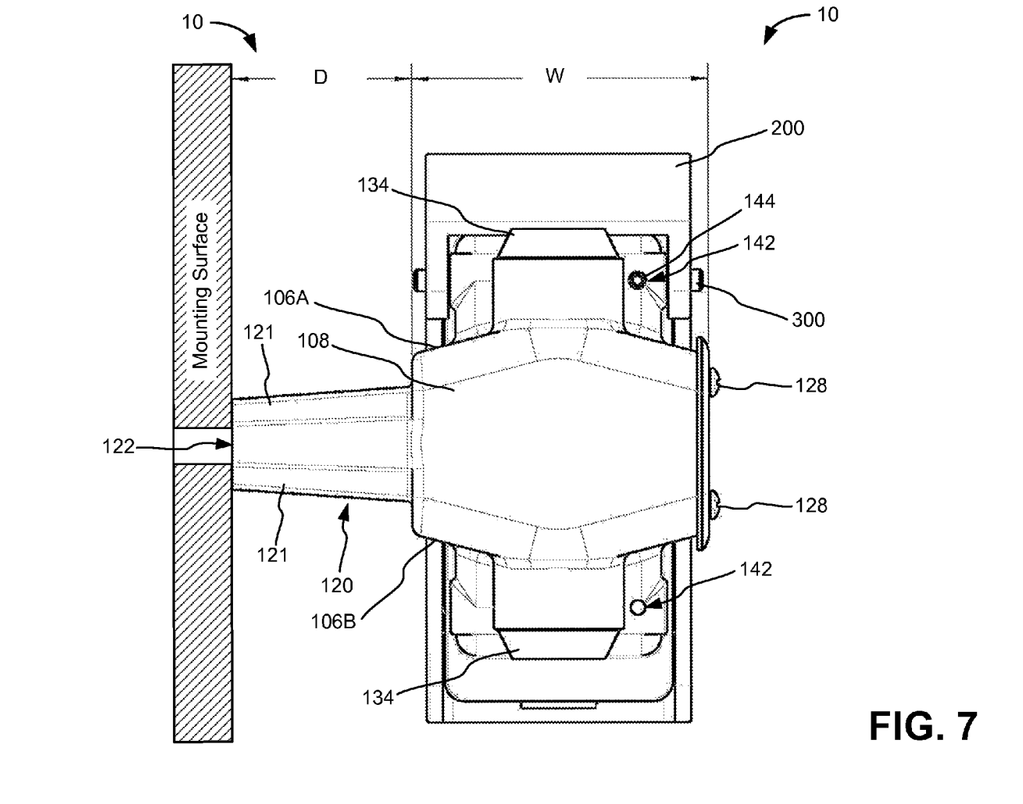
FIG. 7 provides a side view of the side-open electrical box assembly of FIG. 1.
Figure 8:
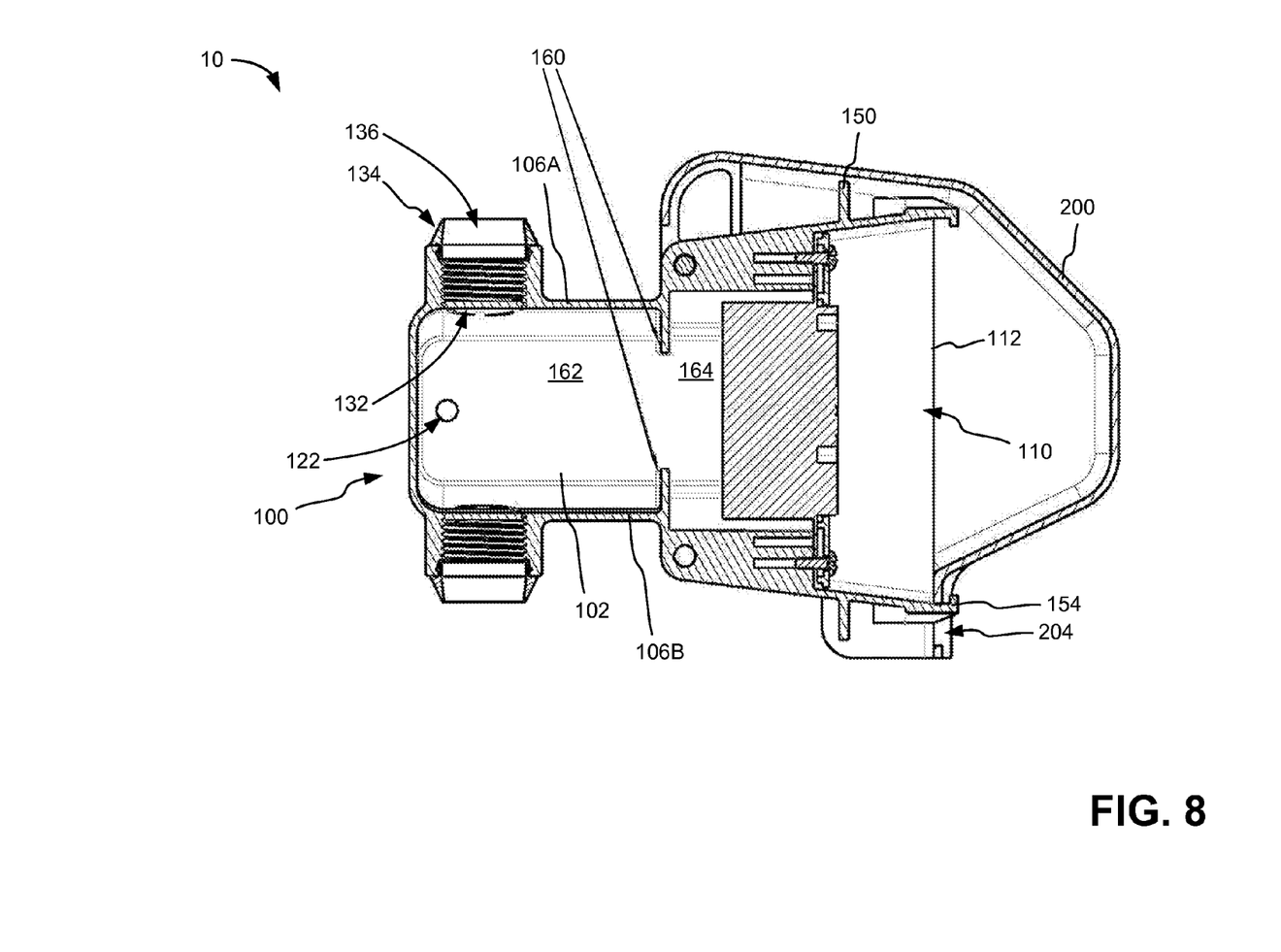
FIG. 8 provides a cutaway front view of the side-open electrical box assembly of FIG. 5B.

When base 100 is installed, back wall 102 may extend essentially parallel to a mounting surface (e.g., a wall, stud, or another surface). Wall 102 may include multiple standoffs 120, extending laterally from wall 102, for mounting base 100 to the mounting surface. FIG. 7 provides a side view of electrical box assembly 10, and FIG. 8 provides a cross-sectional view of electrical box assembly 10. As shown, for example, in FIG. 7, standoffs 120 may provide a distance, D, between the mounting surface and back wall 102 as required by industry standards for particular types of environments. The standoff may also provide clearance from the mounting surface to permit opening/closing movement of hood 200 (e.g., without scraping the mounting surface).

As shown, for example, in FIGS. 3 and 7, each of standoffs 120 may include top/bottom reinforcing ribs 121 and an aperture 122. Top/bottom reinforcing ribs 121 may generally extend along the length of standoff 120 on a top and bottom portion standoff 120 (in either a left-side open or right-side open orientation of base 100). In one implementation, the width and/or thickness of top/bottom reinforcing ribs 121 may gradually taper as top/bottom reinforcing ribs 121 extend from back wall 102 toward a distal end of standoff 120. Top/bottom reinforcing ribs 121 provide an increased surface area to engage a mounting surface and stabilize base 100 against vertical forces. The inclusion of top/bottom reinforcing ribs 121 on each of standoffs 120 allows for installation of base 100 to the mounting surface with minimum mounting hardware. Each aperture 122 may be configured to receive the mounting hardware, such as a screw, bolt, nail, or another fastening device for mounting base 100 to the mounting surface. Each aperture 122 may generally extend longitudinally along standoff 120 from an interior surface of back wall 102 to a distal end of standoff 120.

Referring generally to FIGS. 1-8, front wall 104 may extend essentially parallel to back wall 102 and may include an access aperture 124 with mounting lugs 126 configured to secure a cover plate 130. Cover plate 130 may be removably attached to base 100 to permit access to the interior of base 100 for connecting cables and/or installing mounting hardware through apertures 122. Cover plate 130 may be secured to front wall 104 by fasteners 128, such as screws, bolts, etc. In one implementation, cover plate 130 may be configured to be secured to base 100 in either a left- or right-side orientation (e.g., to orient a label, instructions, etc.). Cover plate 130 may be made of the same or different material than that of base 100. In one implementation, cover plate 130 may include a gasket (not shown) to ensure a water-tight seal between front wall 104 and cover plate 130. The gasket may be made, for example, from a rubber material.

Top/bottom walls 106 may be configured similarly (e.g., as mirror images) to accommodate installation of base 100 in either a right-facing or left-facing orientation. For example, as shown in FIGS. 5A and 5B, electrical box assembly 10 may be rotated at installation such that top/bottom walls 106A and 106B may be interchangeably oriented as top or bottom surfaces, depending on the desired orientation of side opening 110 (e.g., a right-facing or left-facing). As shown, for example, in FIG. 7, top/bottom walls 106A and 106B both include sloped surfaces configured to shed liquid when installed in a top position (e.g., wall 106A when electrical box assembly 10 is in a right-open orientation and wall 106B when electrical box assembly 10 is in a left-open orientation). As described further herein, hood 200/hinge pin 300 may then be secured to base 100 to provide a top-mounted hinge location for electrical box assembly 10 in either the right-open or left-open orientation.

Top/bottom wall 106 may include a conduit opening 132 (e.g., so that conduit may be led into electrical box 100). In one implementation, conduit opening 132 may include internal threads to receive a polymer conduit seal 134. Conduit seal 134 may include an opening 136 to accept conduit therethrough and threads to engage conduit opening 132 of top/bottom wall 106. Conduit seal 134 may be formed from a different material than that of base 100. For example, conduit seal 134 may be formed from nylon, senoprene, or another corrosion-resistant material. Conduit seal 134 may further include a sloped surface 138 to permit run-off of water away from the interface of conduit seal 134 and the conduit.

Top/bottom wall 106 may further include a channel 140 to receive hinge pin 300. Channel 140 may permit hinge pin 300 to be removably inserted through base 100 and corresponding mounting holes 202 (described further below) in hood 200. Hinge pin 300 may extend, for example, the full width of hood 200 (e.g., from back wall 102 to front wall 104) so as to engage mounting holes 202 on either side of hood 200 when hinge pin 300 is inserted into base 100/hood 200. In one implementation, hinge pin 300 may include a groove 302 to secure hinge pin 300 within base 100. Top/bottom wall 106 may include a threaded opening 142 that is configured to receive a set screw 144. Threaded opening 142 may align set screw 144 with groove 302. When hinge pin 300 is installed within channel 140, set screw 144 may be inserted through threaded opening 142 to engage groove 302 and prevent removal of hinge pin 300 from channel 140. Hinge pin 300 may be inserted into channel 140 associated with top/bottom wall 106A when a right-open orientation of electrical box assembly 10 is desired. Alternatively, hinge pin 300 may be inserted into channel 140 associated with top/bottom wall 106B when a left-open orientation of electrical box assembly 10 is desired.

Back wall edge 112, front wall edge 114, and top/bottom wall edges 116 may have different configurations to form a shape of opening 110. A flange 150 may be set back from opening 110. Flange 150 may extend laterally from a portion of each of back wall 102, front wall 104, and top/bottom walls 106. When hood 200 is in a close position, flange 150 may fit under at least a portion of hood 200. More particularly, in one implementation, the portion of flange 150 along back wall 102, front wall 104, and top wall 106 may fit under hood 200 when hood 200 is closed. Flange 150 may act as a splash guard to prevent liquid from creeping under hood 200 past opening 110.

Back wall edge 112, front wall edge 114, and top/bottom wall edges 116 may generally extend a distance beyond flange 150. Front wall edge 114 may include a recess 152 to allow a person to view an installed electrical device (e.g., an installed switch or outlet) without having to look straight into opening 110 when hood 200 is in an open position.

Each of top/bottom wall edges 116 may include a latch clip 154 and one or more cord exit recesses 156. Latch clip 154 may be configured to engage hood 200 to releasably secure hood 200 in a closed position. Cord exit recesses 156 may provide an exit port for a cord (e.g., associated with a plug that is inserted into an outlet installed in base 100) when hood 200 is in a closed position. Lower cord exit recesses 156 associated with top/bottom wall edges 116A would be used in a left-open orientation of electrical box assembly 10. Alternatively, lower cord exit recesses 156 associated with top/bottom wall edges 116B would be used in a right-open orientation of electrical box assembly 10.

Hood 200 may include a set of generally oval mounting holes 202 and an opening 204. Mounting holes 202 may be located on opposite sides of hood 200 and may be configured to secure hood 200 onto hinge pin 300. Hood 200 may be configured to cause opening 204 to engage latch clip 154 of base 100 (e.g., when hood 200 is in a closed position). Hood 200 may generally be sized to close over an electrical plug/cord inserted into an electrical device (e.g., an outlet) installed in base 100. For example, in one implementation, hood 200 may be sized to close over an electrical plug with room for an associated cord to bend to exit through cord exit recess 156 of top/bottom wall 106. Electrical box assembly 10 may be configured to require both a lifting and pivoting motion to release hood 200 from a closed position. The oval shape of mounting holes 202 allows hood 200 to lift slightly to allow hood 200 to clear latch clip 154 at opening 204 before pivoting about hinge pin 300 to open hood 200. In one implementation, electrical box assembly 100 may be self-closing, such that the weight of hood 200 would cause an open hood 200 to fall and pivot on hinge 300 to so that opening 204 may engage latch clip 154.

On the inside of base 100, each of top/bottom walls 106 may further include a partition 160. Partition 160 may be integrally formed on the inside surface of top/bottom walls 106 and may span between inside surfaces of back wall 102 and front wall 104, respectively. Generally, partition 160 may define base 100 into a conduit area 162 and a device mounting area 164. Partition 160 may prevent moisture/condensation in conduit area 162 (e.g., that enters through conduit opening 132 of top/bottom walls 106 and opening 136 of conduit seal 134) from migrating to device mounting area 164. Also, when conduit opening 132 of top/bottom wall 106 is positioned on the bottom of an installed electrical box assembly 10, conduit opening 132 may provide an exit path for moisture within conduit area 162.

Implementations described herein provide an electrical box assembly with a universal fit that can be mounted with either a right-side or left-side orientation. The electrical box assembly may include a base, a hood, and a hinge pin. The base may have box-like structure with an open side face for mounting an electrical device therein. The open side face may be configured to receive the electrical device facing essentially perpendicular to a plane of a mounting surface. The base also includes one or more standoffs configured to provide a mounting structure and to position the box-like structure away from the mounting surface. The base further may include a first hinge pin mount to receive the hinge pin when the base is installed to the mounting surface with the open side face on a left side and a second hinge pin mount configured to receive the hinge pin when the base is installed to the mounting surface with the open side face on a right side. The hinge pin may be configured to be removably inserted in either of the first hinge mount or the second hinge mount. The hood may be configured to engage the hinge pin and to cover the side opening of the base. The electrical box assembly is configured to provide a top-hinged orientation of the hood when the electrical box is installed with the side opening facing either of the left side or the right side. Thus, a single part (or stock-keeping unit) may be provided for both left- and right-facing orientations.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An electrical box assembly, comprising:
a base including:
   a box-like structure with an open side face for mounting an electrical device, the open side face being configured to receive the electrical device facing essentially perpendicular to a plane of a mounting surface,
   a standoff configured to provide a mounting structure and to position the box-like structure away from the mounting surface,
   a first hinge pin mount configured to receive a hinge pin when the base is installed to the mounting surface with the open side face on a left side, and
   a second hinge pin mount configured to receive the hinge pin when the base is installed to the mounting surface with the open side face on a right side;
the hinge pin configured to be removably inserted in either of the first hinge mount or the second hinge mount; and
a hood configured to engage the hinge pin and to cover the side opening of the base,
wherein the electrical box assembly is configured to provide a top-hinged orientation of the hood when the electrical box is installed with the side opening facing either of the left side or the right side.

2. The electrical box assembly of claim 1, wherein the base further comprises:
a back wall and a front wall configured to be essentially parallel to the mounting surface when the base is installed to the mounting surface,
a top wall connected to the back wall and the front wall,
a bottom wall connected to the back wall and the front wall, and
a side wall connected to the back wall, the front wall, the top wall, and the bottom wall,
wherein the standoff extends laterally from the back wall and includes an aperture therethrough to receive a mounting fastener.

3. The electrical box assembly of claim 2, wherein the front wall includes an opening and a removable cover plate, wherein the aperture is accessible through the opening when the cover plate is removed.

4. The electrical box assembly of claim 2, wherein the top wall and the bottom wall both include a threaded opening configured to receive a seal for conduit.

5. The electrical box assembly of claim 2, wherein the base further comprises a conduit opening and wherein the top wall and the bottom wall both include a partition, located between the conduit opening and the side opening and extending laterally toward the inside of the base, to separate a conduit area and a device mounting area within the base.

6. The electrical box assembly of claim 2, wherein the base is configured to receive the electrical device within the opening such that at least a portion of the back wall, the front wall, the top wall, and the bottom wall extend beyond the installed electrical device, and wherein the front wall includes a recess adjacent to the opening to provide improved visibility of the electrical device from a viewpoint in front of the electrical box assembly.

7. The electrical box assembly of claim 2, wherein the base is configured to receive the electrical device within the opening such that at least a portion of the top wall and the bottom wall extend beyond the installed electrical device, and wherein the top wall and the bottom wall both include a recess, adjacent to the opening, configured to receive an electrical cord.

8. The electrical box assembly of claim 1, wherein the base further comprises a flange extending around a perimeter of the base and essentially perpendicular to the plane of the mounting surface.

9. The electrical box assembly of claim 8, wherein the flange is configured to fit under at least a portion of the hood.

10. The electrical box assembly of claim 1, wherein the base and the hood comprise a stainless steel material.

11. The electrical box assembly of claim 1, wherein the base further includes:
a first latch clip configured to receive the hood when the base is installed to the mounting surface with the open side face on a right side,
a second latch clip configured to receive the hood when the base is installed to the mounting surface with the open side face on a left side; and
wherein the hood further includes a latch opening to engage the first latch clip or the second latch clip when the hood is in a closed position.

12. An electrical box, comprising:
a back wall and a front wall configured to be essentially parallel to a mounting surface when the base is installed to the mounting surface;
a pair of interchangeable top and bottom walls, each interchangeable top and bottom wall connected to the back wall and the front wall;
a side wall connected to the back wall, the front wall, and the pair of interchangeable top and bottom walls;
an open end, opposite the side wall, configured to receive an electrical device therein; and
a standoff extending laterally from the back wall, the standoff configured to provide a mounting structure and to position the base away from the mounting surface,
wherein the electrical box is configured to receive a top-mounted hood to cover the open end when the electrical box is installed with the open end positioned to face either of a right side or a left side.

13. The electrical box of claim 12, further comprising a conduit opening that is separate from the open end.

14. The electrical box of claim 12, further comprising a partition on each of the interchangeable top and bottom walls, wherein each partition extends laterally toward the inside of the base to prevent migration of water past the partition.

15. The electrical box of claim 12, wherein the electrical box is configured to receive the electrical device within the open end such that at least a portion of each of the interchangeable top and bottom walls extend beyond the installed electrical device, and wherein the interchangeable top and bottom walls both include a recess, adjacent to the opening, configured to receive an electrical cord.

16. The electrical box of claim 12, wherein the interchangeable top and bottom walls both include a latch clip, adjacent to the opening, configured to receive an aperture of the top-mounted hood.

17. The electrical box of claim 12, wherein the interchangeable top and bottom walls both include a sloped surface configured to shed liquid when installed in a top position.

18. The electrical box of claim 12, further comprising:
a flange extending laterally around a perimeter of the back wall, the front wall, and the pair of interchangeable top and bottom walls, wherein the flange is configured to be under a top-mounted hood covering the open end.

19. The electrical box of claim 12, wherein the front wall comprises an opening and a multiple mounting lugs to receive a removable cover plate, wherein the opening permits access to an aperture in the standoff on the back wall.

20. The electrical box of claim 12, wherein the interchangeable top and bottom walls both include a conduit opening, configured to receive conduit seal, wherein the conduit opening provides an exit path for moisture when oriented on the bottom of the electrical box.

21. An electrical box, comprising:
a box-like structure with an open side face for mounting an electrical device, the open side face being configured to receive the electrical device facing essentially perpendicular to a plane of a mounting surface; and
a standoff configured to position the box-like structure away from the mounting surface, wherein the standoff includes an aperture extending longitudinally therethrough and a top reinforcing rib and a bottom reinforcing rib each extending longitudinally along a length of the standoff,
wherein the electrical box is configured to receive a top-mounted hood to cover the open side face when the electrical box is installed with the open side face positioned toward either of a right side or a left side.

* * * * *